United States Patent [19]

Jennings, Jr. et al.

[11] Patent Number: 4,811,790
[45] Date of Patent: Mar. 14, 1989

[54] WELL BORE DEVICE AND METHOD FOR SAND CONTROL

[75] Inventors: Alfred R. Jennings, Jr.; Lawrence R. Stowe, both of Plano, Tex.

[73] Assignee: Mobil Oil Corporation, New York, N.Y.

[21] Appl. No.: 90,063

[22] Filed: Aug. 27, 1987

[51] Int. Cl.⁴ .......................................... E21B 43/08
[52] U.S. Cl. ..................... 166/278; 166/228; 166/229; 166/236
[58] Field of Search ............... 166/278, 276, 227, 228, 166/229, 235, 236, 205; 175/312

[56] References Cited

U.S. PATENT DOCUMENTS

| | | | |
|---|---|---|---|
| 2,335,558 | 11/1943 | Young | 166/228 |
| 2,981,332 | 4/1961 | Miller et al. | 166/228 |
| 3,107,727 | 10/1963 | Howard | 166/228 |
| 3,133,595 | 5/1964 | Loughrey et al. | 166/228 |
| 3,255,821 | 6/1966 | Curlet | 166/235 |
| 3,280,911 | 10/1966 | Strange et al. | 166/228 |
| 3,379,252 | 4/1968 | Heckler et al. | 166/228 |
| 4,332,295 | 6/1982 | LaHaye et al. | 165/178 |
| 4,341,725 | 7/1982 | Weaver et al. | 264/28 |
| 4,571,414 | 2/1986 | Renlund et al. | 524/322 |
| 4,583,594 | 4/1986 | Kojicic | 166/228 |

FOREIGN PATENT DOCUMENTS 0981592 12/1982 U.S.S.R. ........................ 166/227

Primary Examiner—Jerome W. Massie
Assistant Examiner—Terry Lee Melius
Attorney, Agent, or Firm—Alexander J. McKillop; Charles J. Speciale; Charles A. Malone

[57] ABSTRACT

A process and apparatus for removing particulate matter from fluid wells where low pH conditions or high temperature exist. The process comprises forming a cylindrical shaped retainer having one closed and one open end. Said retainer has an inner and an outer wall which join with said closed end to provide a space between said walls. An open ended fused porous refractory tube is fitted within said space. Said retainer, with the refractory tube therein, is affixed to a delivery tube. This tube is directed into a formation where said refractory tube is used to control fines or sandflow entrained in fluids obtained from said formation. Being sandwiched between said walls, the refractory tube is protected from shock and is easily removed for cleaning. Said refractory tube is chemically resistant and endures high temperatures encountered during steam-flooding or steam injection.

18 Claims, 1 Drawing Sheet

WELL BORE DEVICE AND METHOD FOR SAND CONTROL

RELATED APPLICATIONS

This application is related to application Ser. No. 906,004, our Docket No. 4088, which was filed on Sept. 11, 1986, now abandoned.

FIELD OF THE INVENTION

The invention relates to an improved method of forming a fused refractory section for sand control where steam injection is utilized in the production of hydrocarbonaceous fluids. Said section is permeable and enclosed within walls having holes therein which makes it effective against being dissolved by the continuous flow of steam, prevents entry of fine particles, and is cushioned from shock.

BACKGROUND OF THE INVENTION

Recovery of formation fluid such as petroleum from a subterranean formation is frequently difficult when the subterranean formation is comprised of one or more incompetent or unconsolidated sand layers or zones. Sand particles in the incompetent or unconsolidated sand zone move or migrate into the well bore during the recovery of formation fluids from that zone, or sand particles move away from the well during the injection of secondary or tertiary recovery fluids into the formation. In the instance of recovering fluid from the formation, the movement of sand into the well bore can cause the well to cease production of fluids. Also, small sand particles can plug small opening and porous masses formed around the well bore for the purpose of restraining the flow of sand, such as screens or slotted liners which are frequently placed in wells for this purpose. Not only can fluid production be reduced or even stopped altogether, if sand particles flow through the well to the surface, considerable mechanical problems can result from passage of abrasive sand particles through pumps and other mechanical devices.

Many techniques have been described in the prior art for preventing or decreasing the flow of sand into a well during petroleum production, including the use of sand screens, filters, and perforated or slotted liners. These prior art attempts have been successful in some limited instances, but have not always been entirely satisfactory for a number of reasons. Mechanical devices usually restrain only the larger particle sand and are not completely effective for the purpose of restraining or preventing the flow of fine particles from the formation into the well and ultimately to the surface. Furthermore, the devices interfere with various types of completions and workover operations. Additionally, many of the devices were not able to withstand the combination of high temperatures and high pH often encountered.

Serious problems have been encountered in attempting to use conventional production strings in conjunction with enhanced recovery techniques involving steam injection, acidizing, or workover fluids. Where high temperature steam, acid, or hot water under high flow rates contact a conventional string, it has been fond that such strings are quickly eroded away or dissolved and must therefore be replaced at frequent intervals.

Therefore, what is needed is a device which can be used as a means of formation fines control which is resistant to shock, replaceable, versatile, and which can be used in conjunction with harsh conditions encountered with enhanced oil recovery techniques.

SUMMARY

This invention concerns a process for removing particulate matter from fluid wells, particularly hydrocarbonaceous fluid ones. To accomplish this, a cylindrically shaped retainer having one closedend and an open end is provided for thereby forming a space between said walls. The opposite end of said retainer is fittingly adapted to be affixed to a delivery tube. Thereafter, an open ended fused refractory tube is formed to be a size sufficient to fit within space formed by said walls.

The retainer containing said refractory tube is affixed to the end of a delivery tube. Said tube is directed into a fluid wall where fluids, particularly hydrocarbonaceous fluids containing fines are produced from a formation. During the production of said fluids low pH and high temperatures are encountered. The refractory tube is able to withstand low pH and high temperature conditions while producing fluids therethrough and removing fines from said fluid. Once said tube has become clogged with said fines, said delivery tube with refractory tube attached, is removed.

Once removed, the refractory tube can either be cleaned or replaced, thus minimizing downtime. When removing the refractory tube from said well, breakage is minimized because the retainer walls having openings therein absorb any unexpected shock. Shocks generated during enhanced oil recovery operations, e.g., steam or water flood, are also absorbed by said walls.

The fused refractory section allows accumulated fines to be removed therefrom in-situ by acids known to those skilled in the art. Hydroflouric acid can be used to remove formation fines from said section. Solvents generally used for production, well completion, and clean up can be used with minimum damage to said section. Also, said section can be used when steam is injected into the wellbore, or into the formation when a steam flood is employed. Said section is able to withstand high formation temperatures and pressures as well as steam temperatures.

It is therefore an object of this invention to provide for a fused refractory section which can be "tailor-made" of dimensions sufficient to fit into the formation's production interval.

It is yet another object of this invention to provide for a fused refractory system which can be made of a porosity sufficient to exclude formation fines regardless of the size of said fines.

It is still yet a further object of this invention to provide for a fused refractory section through which workover fluids and acids can be pumped to clean out said section without removing said section from the wellbore.

It is a still yet even further an object of this invention to provide for a fused refractory section which is suitable for use in a steam flood operation.

Another object of this invention is to provide for external and internal metal sheaths or walls to protect the fused refractory tube or core.

Further, it is an object of this invention to provide for a metal carrier or retainer which will allow the refractory core or tube to be removed or replaced.

These and other objects of this invention will become apparent from the following detailed description together with the accompanying exemplary drawing.

DESCRIPTION OF THE PREFERRED EMBODIMENTS

Figure 2:
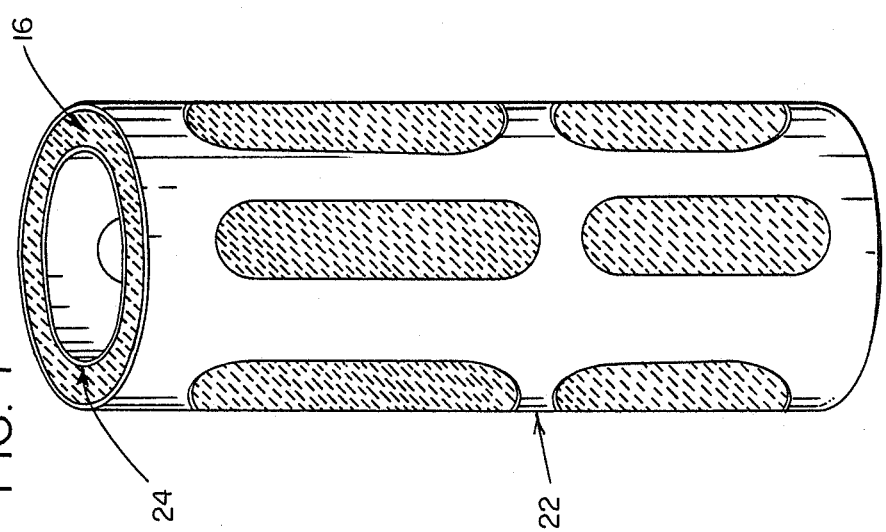
FIG. 2 depicts a side view of the fused refractory section within the internal and external sheaths or walls affixed to a production string within the wellbore.

In the practice of this invention, referring to FIG. 2, the formation contains a production interval 10 which is penetrated by wellbore 12. Wellbore 12 contains perforations 20 which are fluidly connected with production interval 10. A circumferential packer 18 is fittingly adapted within wellbore 12 sufficient to receive production tube assembly 14. Production tube assembly 14 passes through packer 18. A fused silicon carbide section 16 enclosed by outer wall 22 has perforations therein, which outer wall is fittingly adapted onto production tube assembly 14. Said assembly 14 is positioned in wellbore 12 so that fused refractory section 16 in said outer wall 22 is adjacent to production interval 10. When well 12 is produced, hydrocarbonaceous fluids leave production interval 10 via perforations 20 and enter fused refractory section 16 via openings contained in outer wall 22 where formation fines entrained in hydrocarbonaceous fluids are removed. Said fines are removed because pores in section 16 are smaller than the entrained fines in said fluid.

Fused refractory section 16 can be made by using silicon carbide. A method can be used as disclosed in U.S. Pat. No. 4,571,414 for molding the silicon carbide section 16. This patent is hereby incorporated by reference. Another method for molding tubing section 16 is discussed in U.S. Pat. No. 4,341,725 issued to Weaver et al on July 27, 1982. This patent is hereby incorporated by reference.

Section 16 is constructed of silicon carbide of a density sufficient to exclude fines of a size anticipated to be encountered in a formation. By utilizing this invention, fused refractory section 16 can be made of a porosity sufficient for the formation where deployed. Generally, the density will be about 3.0 to about 4.0 gms. per cubic centimeter. It can also be constructed of the desired porosity while retaining the required thermal and chemical resistance characteristics. Although the porosity will vary because of differing environments within a formation, the pores in said tubing should be about 44 to about 500 microns in size.

Fused refractory section 16 can be formed into a tube. This can be accomplished by molding said section 16 as mentioned in the above-mentioned methods. Said section 16 is preferably made of ceramic which provides resistance to high temperatures encountered which can be from about ambient up to about 600° F. while at the same time providing for good heat transfer. Most ceramics have low thermal conductivity with the exception of silicon carbide and silicon nitride which are preferred for use in the present invention. Other ceramics can be used which have a thermal conductivity of at least 3 BTU/hr/ft[2]/° F./ft. Similar ceramics are discussed in U.S. Pat. No. 4,332,295 issued to LaHaye et al. on June 1, 1982. For example, section 16 can be cast from a commercially available castable silicon carbide such as Carbofrax 11, a product of the Carborundum Company of Niagara Falls, N.Y. This product is typically mixed with water and cast to a desired shape and then fired to temperatures over 1800° F. to develop strength and good thermal conductivity. The castable silicon carbide may also use a material such as calciumaluminate as a binder. This silicon carbide material may be cast at room temperature and allowed to cure at room temperature. It may then be preheated for a period of time and then fired at above 2100° F. for a period of about four hours.

Section 16 should be composed of a ceramic material having a density preferably of about 65 to about 75% of the full density. The silicon carbide that is selected is preferably of a density in the order of about 3.0 grams per cubic centimeter. Where silicon nitride is used, it similarly has a density on the order of about 3.0 grams per cubic centimeter. It is preferred that section 16 have a density greater than about 65% of theoretical full density. The thermal coefficient of expansion of the ceramic material should be compatible with the metal or a thermosettable resin used in forming inner (24) and outer (22) sheaths or walls.

Section 16 should be comprised of materials to make it resistant to thermal shock and also resistant to chemical attack at high temperatures. Alloys of silicon carbide, silicon nitride, or other similar ceramics can be used to construct section 16. U.S. Pat. No. 4,332,295 issued to La Haye et al. discloses other ceramic compositions which can be used in constructing section 16. This patent is hereby incorporated by reference.

Fused refractory section 16 can be made sufficiently porous to admit hydrocarbonaceous fluids while excluding formation fines. The desired porosity can be obtained by varying the density of the ceramic material utilized. Also the size, shape, diameter, chemical resistance, and thermal resistance can be modified to conform to the dictates of the particular formation where utilized. As is preferred, said refractory section 16 should have a wall thickness of about 5 to about 40 millimeters and sufficient to withstand pressures of from about 1,000 to about 15,000 psig.

Figure 1:
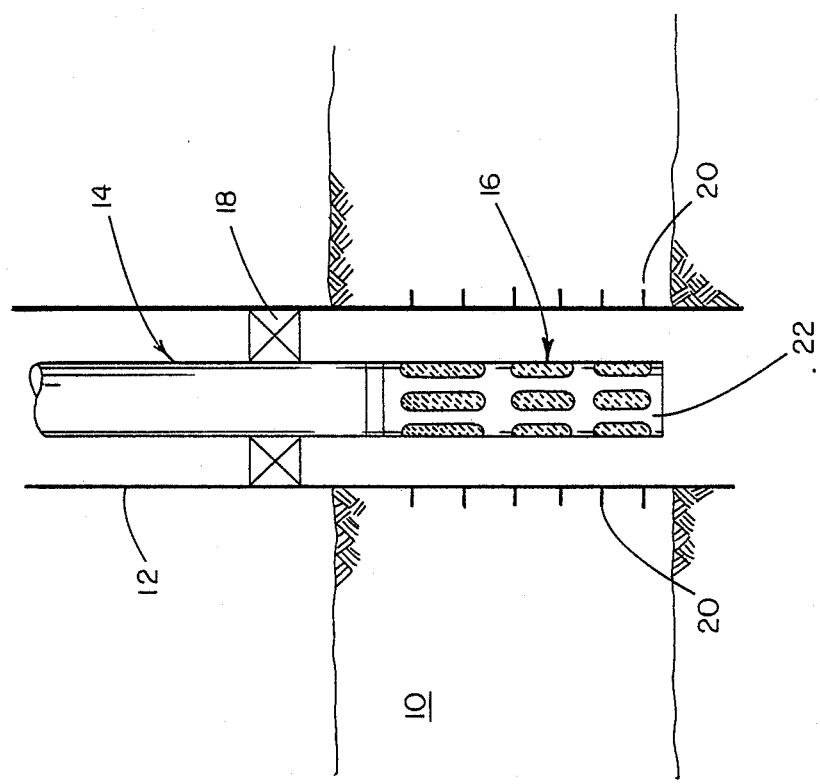
FIG. 1 is an exposed view of the fused refractory core or tube within the retainer which has internal and external sheaths or walls.

The refractory porous section 16 is positioned and fittingly adapted to be affixed to a delivery tube or production tube assembly 14 via a cylindrically shaped retainer. This retainer, as shown in FIG. 1, has one closed end and one open end. Affixed to the closed end is inner wall 24 and outer wall 22. Outer wall 22 has openings therein which allows fluid communication with refractory tube 16. Open ended refractory tube 16 is formed to be of a size sufficient to fit within the space provided for by inner wall or sheath 24 and outer wall of sheath 22. These walls, 22 and 24, at the open end of the retainer are fittingly adapted to be affixed to the delivery tube or production tube assembly 14. When refractory tube 16 is positioned within said walls, (22 and 24) they protect refractory tube 16 from shock and facilitate removal of said tube 16. The preferred method for affixing said retainer to production tube assembly 14 is by screwing it thereon thereby causing it to fluidly communicate with the production interval 10 when positioned in the formation. Said retainer is formed by having the closed cylindrical end contact the concentric outer wall 22 and concentric outer wall 24. Both walls have openings therein to allow entry therethrough of fluids into core 16 which is sandwiched between said walls. This retainer is preferably made of a metal sufficient to withstand high temperatures, pressures and low pH conditions encountered during enhanced oil recovery operations. Although metal is preferred, said retainer can be made of a thermosettable polymer sufficient to withstand said conditions encountered during enhanced oil recovery operations. Said thermosettable polymers include Bake-Lite TM, epoxy resins, and certain phenolic resins. Said retainer also serves to protect refractory tube 16 from shock when impact is made with the retainer and refractory tube 16 therein when directing production tube assembly 14 out of or into the formation.

Obviously, many other variations and modifications of this invention, as previously set forth, may be made without departing from the spirit and scope of this invention as those skilled in the art readily understand. Such variations and modifications are considered part of this invention and within the purview and scope of the appended claims.

What is claimed is:

1. A process for removing particulate matter or formation fines during the production of hydrocarbonaceous fluids from a formation where a production tubing string is used in a wellbore comprising:
   (a) forming a cylindrically shaped retainer having one closed and one open end, with an inner and outer wall of similar construction having a space therebetween as one end of each said wall is affixed to said closed end of said retainer and the opposite end of each said wall is in fluid communication with a producting tubing string;
   (b) placing within said retainer an open ended fused porous refractory tube of a size sufficient to fit within the space formed by said walls thereby protecting said tube from shock and facilitating removal of said tube for replacement or cleaning;
   (c) fluidly communicating said retainer with said refractory tube therein, with said production string; and
   (d) directing said production string to the producing interval in said formation and removing hydrocarbonaceous fluids from said formation while excluding entry of said fines from said fluid via the refractory tube.

2. The process as recited in claim 1 wherein in step (b) said refractory tube has a porosity which is predetermiend in accordance with the size of particulate matter desired to be removed.

3. The process as recited in claim 1 where in step (b) said refractory tube comprises a ceramic material selected from a member of the group consisting of silicon carbide or silicon nitride and which has a density of from about 65 to about 75% of the full density of said member.

4. The process as recited in claim 1 where in step (b) said refractory tube is capable of withstanding pressures of from about 1,000 to about 15,000 psig.

5. The process as recited in claim 1 where in step (b) said refractory tube is capable of withstanding temperatures of from about ambient to about 600° F.

6. The process as recited in claim 1 where in step (b) said refractory tube is used during steam injection or a steam flood to exclude said fines while producing hydrocarbonaceous fluids from a formation or reservoir.

7. The process as recited in claim 1 where in step (b) said refractory tube has a porosity of from about 44 to about 500 microns.

8. The process as recited in claim 1 where in step (b) said refractory tube has a wall thickness of about 5 to about 40 millimeters.

9. The process as recited in claim 1 where in step (a) said retainer is comprised of metal or a thermosettable polymer sufficient to withstand conditions encountered during enhanced oil recovery operations.

10. A method for removing particulate matter from fluid wells comprising:
    (a) forming a cylindrically shaped retainer having one closed and one open end, with an inner and outer wall of similar construction having a space therebetween as one end of each said wall is affixed to said closed end of said retainer and the opposite end of each said wall is in fluid communication with a delivery tube positioned in said fluid well;
    (b) forming an open ended fused porous refractory tube of a size sufficient to fit within the space formed by said walls thereby protecting said tube from shock and facilitating removal of said tube for replacement or cleaning;
    (c) placing within said retainer the open ended fused porous refractory tube which tube excludes fines from a hydrocarbonaceous fluid and
    (d) fluidly communicating said retainer with said refractory tube therein, with said delivery tube.

11. The method as recited in claim 10 where said delivery tube is a production string used to recover hydrocarbonaceous fluids from a well.

12. The method as recited in claim 10 where in step (b) said refractory tube has a porosity which is predetermined in accordance with the size of particulate matter desired to be removed.

13. The method as recited in claim 10 where in step (b) said refractory tube comprises a ceramic material selected from a member of the group consisting of silicon carbide or silicon nitride and which has a density of from about 65 to about 75% of the full density of said member.

14. The method as recited in claim 10 where in step (b) said refractory tube is capable of withstanding pressures of from about 1,000 to about 15,000 psig.

15. The method as recited in claim 10 where in step (b) said refractory tube is capable of withstanding temperatures of from about ambient to about 600° F.

16. The method as recited in claim 10 where in step (b) said refractory tube is used during steam injection or a steam flood to exclude particulate matter.

17. The method as recited in claim 10 where in step (b) said refractory tube has a porosity of from about 44 to about 500 microns and a wall thickness of about 5 to about 40 millimeters.

18. The method as recited in claim 10 where in step (a) said retainer is comprised of metal or a thermosettable polymer sufficient to withstand conditions encountered during enhanced oil recovery operations.

* * * * *

UNITED STATES PATENT AND TRADEMARK OFFICE
CERTIFICATE OF CORRECTION

PATENT NO. : 4,811,790

DATED : March 14, 1989

INVENTOR(S) : A.R. Jennings, Jr., et al.

It is certified that error appears in the above-identified patent and that said Letters Patent is hereby corrected as shown below:

| | |
|---|---|
| Abstract, line 3 | "temperature" should be --temperatures-- |
| Col. 1, line 64 | "fond" should be --found-- |
| Col. 2, line 9 | "closedended" should be --closed end-- |
| Col. 2, line 18 | "wall" should be --well-- |
| Col. 5, line 46 | "predetermiend" should be --predetermined-- |

Signed and Sealed this

Fifth Day of December, 1989

Attest:

JEFFREY M. SAMUELS

Attesting Officer     Acting Commissioner of Patents and Trademarks